United States Patent
Ito et al.

(10) Patent No.: US 7,931,075 B2
(45) Date of Patent: Apr. 26, 2011

(54) AIR CONDITIONER

(75) Inventors: Koji Ito, Nagoya (JP); Yoshihiro Goto, Chita-gun (JP); Yoshihiko Okumura, Kariya (JP)

(73) Assignee: Denso Corporation, Kariya (JP)

( * ) Notice: Subject to any disclaimer, the term of this patent is extended or adjusted under 35 U.S.C. 154(b) by 439 days.

(21) Appl. No.: 12/080,220

(22) Filed: Mar. 31, 2008

(65) Prior Publication Data
US 2008/0245088 A1    Oct. 9, 2008

(30) Foreign Application Priority Data
Apr. 4, 2007 (JP) .................. 2007-098749

(51) Int. Cl.
*B60H 1/00* (2006.01)
*B60H 3/00* (2006.01)
*B60H 1/32* (2006.01)
*F24H 3/02* (2006.01)

(52) U.S. Cl. .............. 165/202; 62/239; 62/244; 165/42; 165/43; 165/122

(58) Field of Classification Search .............. 62/239, 62/244; 165/202, 122, 237, 42, 43; 454/161
See application file for complete search history.

(56) References Cited

U.S. PATENT DOCUMENTS

| | | | |
|---|---|---|---|
| 4,958,504 A * | 9/1990 | Ichikawa et al. | 62/244 |
| 5,168,424 A * | 12/1992 | Bolton et al. | 361/695 |
| 5,336,046 A | 8/1994 | Hashimoto et al. | |
| 5,737,936 A | 4/1998 | Takasaki | |
| 6,178,764 B1 * | 1/2001 | Tanaka et al. | 62/296 |
| 6,352,102 B1 | 3/2002 | Takechi et al. | |
| 2004/0074248 A1 * | 4/2004 | Tanaka et al. | 62/244 |
| 2004/0093885 A1 * | 5/2004 | Ito et al. | 62/244 |

FOREIGN PATENT DOCUMENTS

| | | |
|---|---|---|
| JP | 60-008105 | 1/1985 |
| JP | 05-172100 | 7/1993 |
| JP | 07-144528 | 6/1995 |

(Continued)

OTHER PUBLICATIONS

Office action dated Dec. 24, 2008 in Japanese Application No. 2007-098749.

(Continued)

*Primary Examiner* — Frantz F Jules
*Assistant Examiner* — Cassey Bauer
(74) *Attorney, Agent, or Firm* — Harness, Dickey & Pierce, PLC

(57) ABSTRACT

In an air conditioner for a vehicle, a blower of a blower unit includes a double-axial motor having a rotation axis positioned approximately in a vehicle top-bottom direction, a pair of centrifugal fans located at two sides of the double-axial motor in an axial direction, and a pair of scroll casings in which the centrifugal fans are accommodated, respectively. The two air outlet portions are arranged in the vehicle top-bottom direction, and are adjacent to be joined to an air inlet portion of the air conditioning unit, substantially as a single air outlet. Furthermore, the two air outlet portions are located approximately at the same height position as that of the air passing portion of the cooling heat exchanger, and have a height dimension (H2) at its downstream end side that is approximately equal to a height dimension (H1) of the air passing portion of the cooling heat exchanger.

17 Claims, 4 Drawing Sheets

FOREIGN PATENT DOCUMENTS

| | | |
|---|---|---|
| JP | 09-048229 | 2/1997 |
| JP | 09-175157 | 7/1997 |
| JP | 10-181336 | 7/1998 |
| JP | 2003-326939 | 11/2003 |
| JP | 2006-240599 | 9/2006 |
| JP | 2006-281905 | 10/2006 |

OTHER PUBLICATIONS

Office action dated Aug. 18, 2009 in corresponding Japanese Application No. 2007-098749.

* cited by examiner

AIR CONDITIONER

CROSS REFERENCE TO RELATED APPLICATION

This application is based on Japanese Patent Application No. 2007-098749 filed on Apr. 4, 2007, the contents of which are incorporated herein by reference in its entirety.

BACKGROUND OF THE INVENTION

1. Field of the Invention

The present invention relates to an air conditioner, which includes an air conditioning unit in which air passes through a cooling heat exchanger approximately horizontally, and a blower unit arranged at a side offset from the air conditioning unit. The air conditioner can be suitably used for a vehicle, for example.

2. Description of the Related Art

FIG. 4 shows a part of a vehicle air conditioner in a related art. As shown in FIG. 4, the vehicle air conditioner includes an air conditioning unit 101 located at a center area on a front side in a passenger compartment, and a blower unit 102 offset to a side from the air conditioning unit 101 in a vehicle right-left direction (vehicle width direction). The blower unit 102 for blowing air toward the air conditioning unit 101 includes a blower 103 and an inside/outside air switching portion 104. The blower 103 includes a drive motor 137, a centrifugal fan 138 and a scroll casing 139, and the inside/outside air switching portion 104 adjusts a ratio between an amount of inside air (i.e., air inside the passenger compartment) and an amount of outside air (i.e., air outside the passenger compartment).

The centrifugal fan 138 is set at an optimum condition where a ratio (H3/D1) of a fan height H3 to a fan diameter D1 is in a range of 0.4 to 0.5, so as to improve the blower efficiency and to reduce noise. Thus, an air outlet portion 141 of the scroll casing 139 is enlarged to a height of an air passing portion of the cooling heat exchanger 112 or an air inlet portion of the air conditioning unit 101 is enlarged to the height of the air passing portion of the cooling heat exchanger 112.

Furthermore, as shown in FIG. 4, refrigerant pipes 126 of the cooling heat exchanger 112 extend to a through hole of a dash panel of the vehicle via a space between the air conditioning unit 1 and the inside/outside air switching portion 4 of the blower unit 2. However, in the vehicle air conditioner shown in FIG. 4, because the height H3 of the scroll casing 139 is generally smaller than the height of the cooling heat exchanger 112, it is necessary to enlarge the air outlet portion 141 when the air outlet portion 141 of the blower unit 102 is connected to the air conditioning unit 101. Thus, pressure loss or noise is generated due to the enlarged air outlet portion 141.

SUMMARY OF THE INVENTION

In view of the foregoing problems, it is an object of the present invention to provide an air conditioner which can effectively reduce a pressure loss and a noise in a portion through which air blown by a blower flows into an air conditioning unit.

According to an aspect of the present invention, an air conditioner for a vehicle includes an air conditioning unit located on a front side in the passenger compartment at an approximately center portion in a vehicle width direction, and a blower unit having a blower that is configured to blow air to the air conditioning unit. A cooling heat exchanger of the air conditioning unit is located to have an air passing portion through which air passes approximately horizontally, and the blower unit is located at a position offset from the air conditioning unit in the vehicle width direction. In the air conditioner, the blower includes a double-axial motor having a rotation axis positioned approximately in a vehicle top-bottom direction, a pair of centrifugal fans located at two sides of the double-axial motor in an axial direction to be driven by the double-axial motor, and a pair of scroll casings in which the centrifugal fans are accommodated, respectively. The pair of scroll casings has two suction ports opened opposite to the centrifugal fans at two sides in the axial direction, and two air outlet portions extending approximately horizontally. The two air outlet portions are arranged in the vehicle top-bottom direction, and are adjacent to each other to be joined to an air inlet portion of the air conditioning unit, substantially as a single air outlet. Furthermore, the two air outlet portions are located approximately at the same height position as that of the air passing portion of the cooling heat exchanger, and have a height dimension (H2) at its downstream end side that is approximately equal to a height dimension (H1) of the air passing portion of the cooling heat exchanger.

Accordingly, the air flow from the blower to the cooling heat exchanger is not rapidly enlarged, and an air flow distribution in a portion from the blower to the cooling heat exchanger can be made uniform, thereby reducing the pressure loss and noise.

For example, the scroll casings may be arranged in the vehicle top-bottom direction to have a space therebetween, and a refrigerant pipe of the cooling heat exchanger may be located in the space. Alternatively, a water pipe of a heating heat exchanger may be located in the space. Therefore, the structure of the air conditioner can be made compact. The double-axial motor may be a brushless motor, as an example.

The centrifugal fan may have a fan diameter that is about in a range between 30% to 60% of the height dimension of the air passing portion of the cooling heat exchanger. Alternatively, the centrifugal fan may have a fan height that is about in a range between 20% to 40% of the height dimension of the air passing portion of the cooling heat exchanger. In this case, it is possible for the blower to be set at an optimum condition where a ratio (H3/D1) of a fan height H3 to a fan diameter D1 is in a range of 0.4 to 0.5, thereby further improving the blower efficiency and reducing noise.

The blower unit may further include an inside/outside air switching portion that is configured to introduce inside air inside the passenger compartment and outside air outside the passenger compartment and to control a ratio between an amount of inside air and an amount of outside air to be introduced. In this case, the inside/outside air switching portion is located at a side of the pair of scroll casings in the vehicle width direction. Furthermore, a filter may be located between the inside/outside air switching portion and the blower to clean air flowing from the inside/outside air switching portion. In this case, the filter may have a height dimension that is approximately the same as a height dimension of the blower unit.

In the air conditioner, the two air outlet portions of the blower unit may extend approximately horizontally to have a space therebetween, and may be joined at a downstream end side without having a space therebetween. Furthermore, the two air outlet portions may have top and bottom surfaces that are approximately parallel to each other.

According to another aspect of the present invention, an air conditioner includes an air conditioning unit including a cooling heat exchanger that is located to have an air passing portion through which air passes approximately in a first direction, and a blower unit having a blower that is configured to blow air to the air conditioning unit. In the air conditioner, the blower includes a double-axial motor having a rotation axis positioned approximately in a second direction perpendicular to the first direction, a pair of centrifugal fans located at two sides of the double-axial motor in an axial direction to be driven by the double-axial motor, and a pair of scroll casings in which the centrifugal fans are accommodated, respectively. The pair of scroll casings has two suction ports opened opposite to the centrifugal fans at two sides in the axial direction, and two air outlet portions extending approximately in a third direction that is perpendicular to both the first direction and the second direction. The two air outlet portions are arranged in the second direction, and are adjacent to each other to be joined to an air inlet portion of the air conditioning unit, substantially as a single air outlet. Furthermore, the two air outlet portions are located approximately at the same position as that of the air passing portion of the cooling heat exchanger in the second direction, and have a dimension (H2) at its downstream end side in the second direction, that is approximately equal to a dimension (H1) of the air passing portion of the cooling heat exchanger in the second direction.

Accordingly, in the air conditioner for various uses, the air flow from the blower to the cooling heat exchanger is not rapidly enlarged, and an air flow distribution in a portion from the blower to the cooling heat exchanger can be made uniform, thereby reducing the pressure loss and noise.

BRIEF DESCRIPTION OF THE DRAWINGS

Additional objects and advantages of the present invention will be more readily apparent from the following detailed description of preferred embodiments when taken together with the accompanying drawings. In which.

DETAILED DESCRIPTION OF THE PREFERRED EMBODIMENTS

Figure 1:
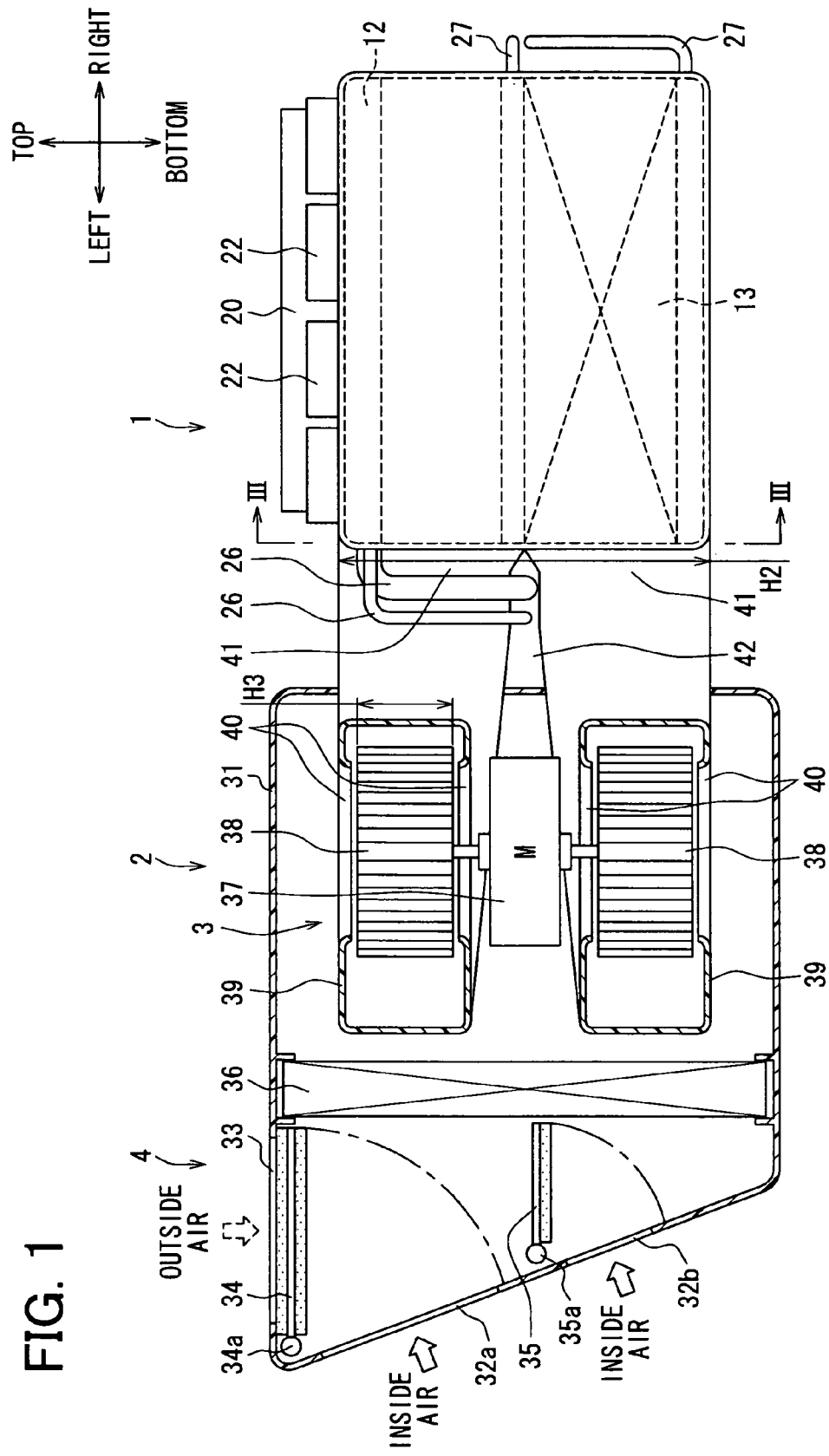
FIG. 1 is a partially sectional front view showing an entire structure of an air conditioner for a vehicle according to an embodiment of the present invention.
Figure 2:
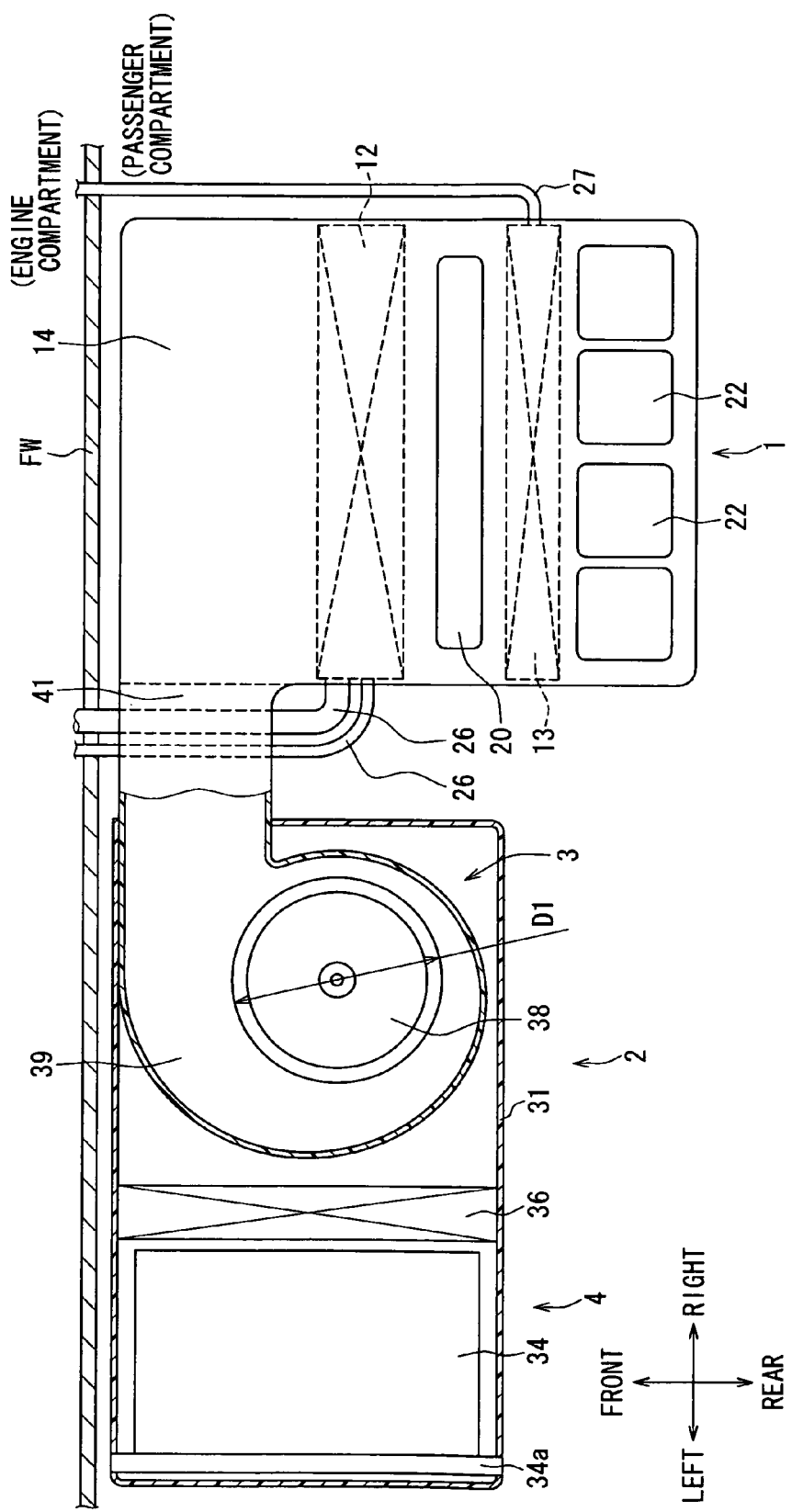
FIG. 2 is a partially sectional top view showing the air conditioner in FIG. 1.
Figure 3:
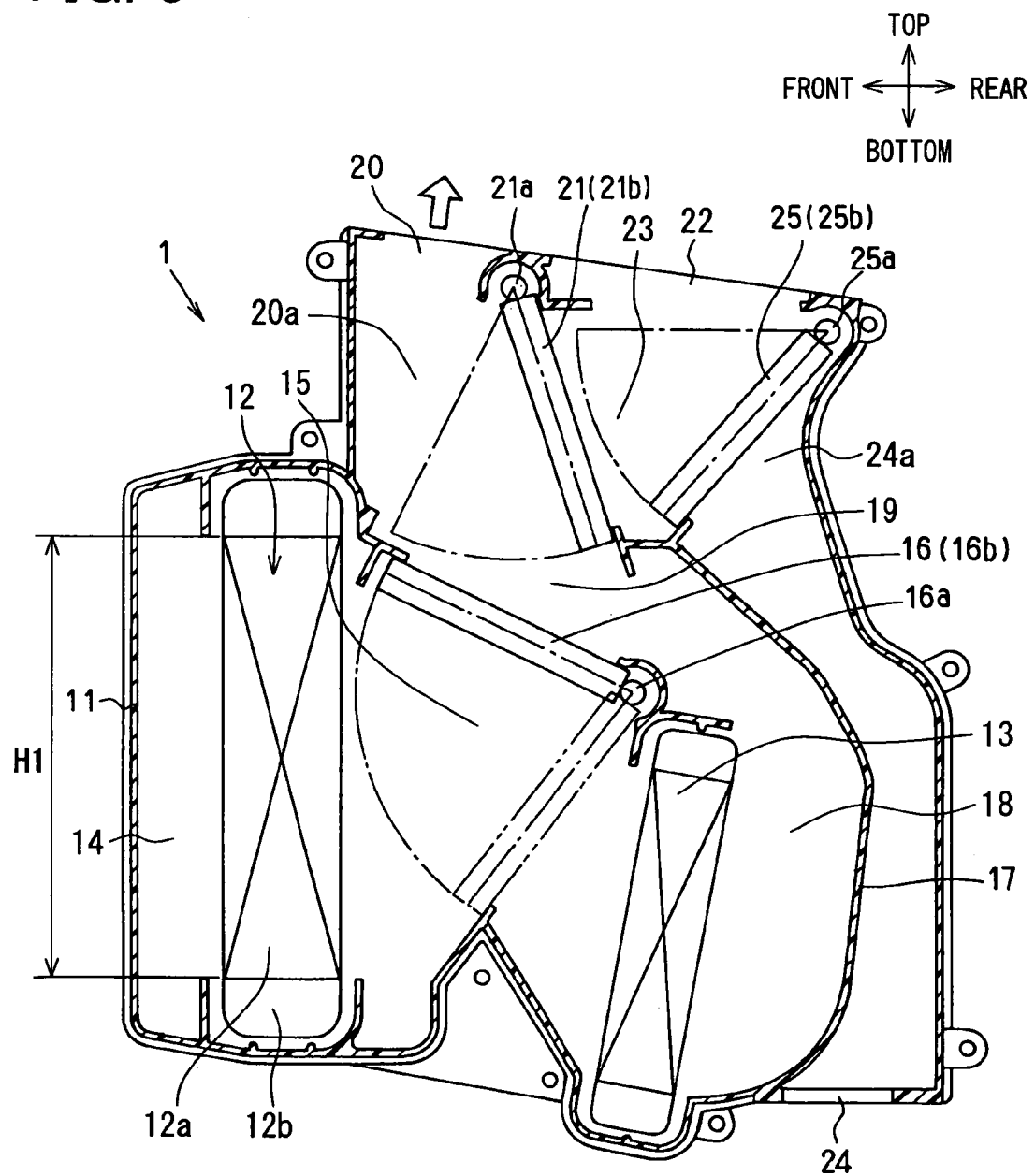
FIG. 3 is a schematic cross-sectional view showing an air conditioning unit, taken along the line III-III in FIG. 1.
Figure 4:
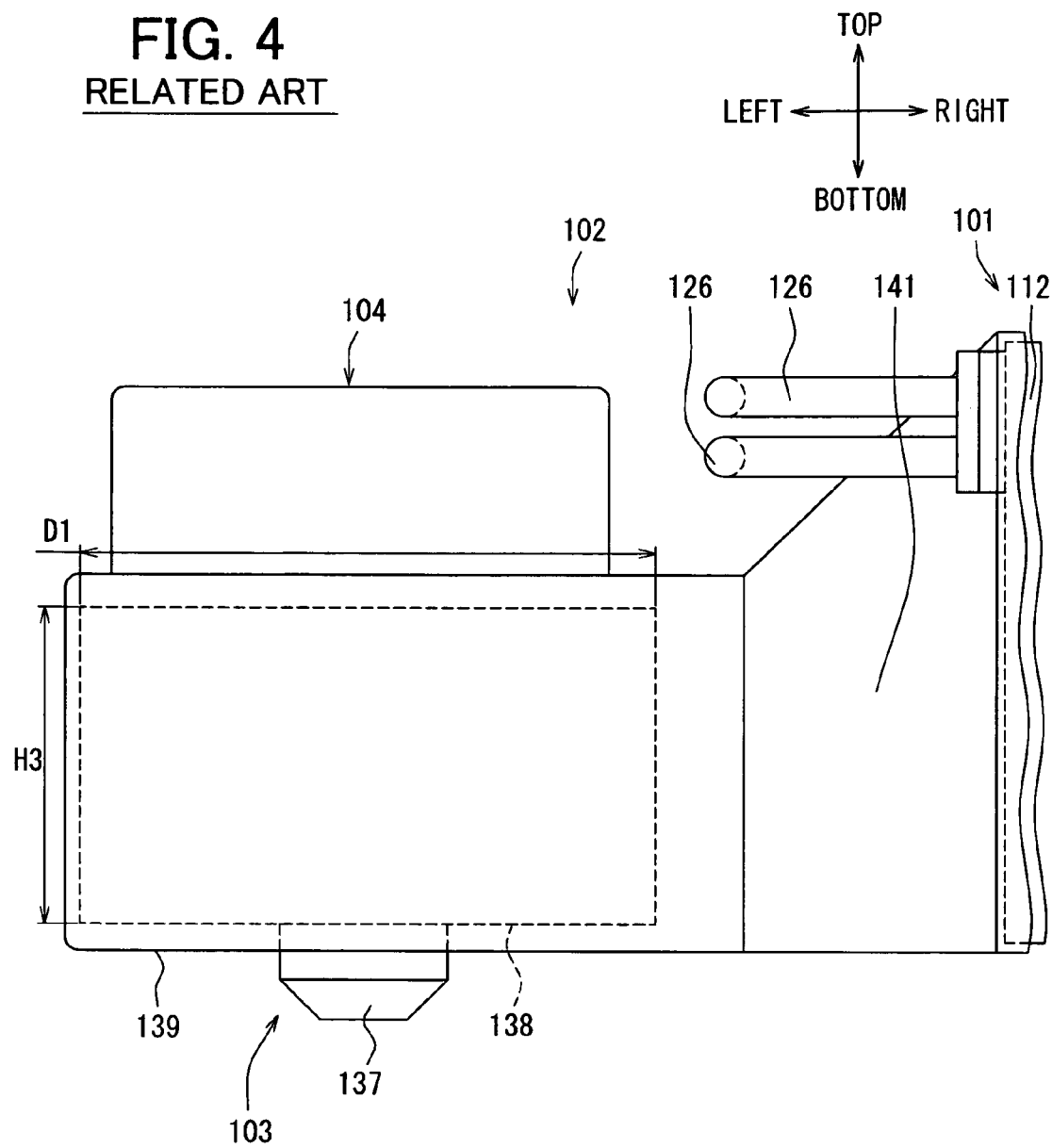
FIG. 4 is a front view showing a part of a vehicle air conditioner in a related art.

An embodiment of the present invention will be described with reference to FIGS. 1 to 3. As shown in FIGS. 1 to 3, a ventilation system of an air conditioner for a vehicle includes an air conditioning unit 1 and a blower unit 2. The vehicle is partitioned by a firewall FW into an engine compartment in which an engine is installed, and a passenger compartment, as shown in FIG. 2.

The air conditioning unit 1 and the blower unit 2 are located in the passenger compartment to be arranged in a vehicle right-left direction (vehicle width direction). The air conditioning unit 1 is located approximately at a center area in the vehicle right-left direction, and the blower unit 2 is located at a side of the air conditioning unit 1 to be offset from the air conditioning unit 1. For example, the blower unit 2 is located under an instrument panel on a front side in the passenger compartment to be shifted from the center area to a front-passenger's seat side in the vehicle right-left direction.

The blower unit 2 includes a blower 3 for blowing air into the air conditioning unit 1, and an inside/outside air switching portion 4. The inside/outside air switching portion 4 is located at a most upstream portion of an air blowing case 31 in which the blower 3 is accommodated. The air blowing case 31 is made of a resin material having a sufficient strength and an elasticity, such as polypropylene.

The inside/outside air switching portion 4 is located to adjust a ratio between an amount of outside air (i.e., air outside the passenger compartment) and an amount of inside air (i.e., air inside the passenger compartment) to be drawn into the blower 3. In this embodiment, the inside/outside air switching portion 4 is provided with first and second inside air suction ports 32a, 32b from which inside air is drawn, and a single outside air suction port 33 from which outside air is drawn. The first inside air suction port 32a that is used as a main inside air suction port 32a and the outside air suction port 33 are selectively opened and closed by using a first inside/outside air switching door 34. The second inside air suction port 32b used in secondary for introducing inside air is opened and closed by a second inside/outside air switching door 35.

The first inside/outside air switching door 34 includes a rotation shaft 34a that is rotatably supported in the air blowing case 31, and a plate portion made of resin to be integrally rotated with the rotation shaft 34a. The first inside/outside air switching door 34 is located such that the plate portion of the first inside/outside air switching door 34 is rotatable in a top-bottom direction of the vehicle. One end of the rotation shaft 34a protrudes to an exterior of the air blowing case 31 to be connected to and rotatable by an inside/outside air adjusting mechanism (actuator mechanism such as a servomotor).

The second inside/outside air switching door 35 includes a rotation shaft 35a that is rotatably supported in the air blowing case 31, and a plate portion made of resin to be integrally rotated with the rotation shaft 35a. The second inside/outside air switching door 35 is located such that the plate portion of the second inside/outside air switching door 35 is rotatable in a top-bottom direction of the vehicle. One end of the rotation shaft 35a protrudes to an exterior of the air blowing case 31 to be connected to and rotatable by the inside/outside air adjusting mechanism (actuator mechanism such as a servomotor). For example, both the first and second inside/outside air switching doors 34, 35 are coupled to a link mechanism to be operatively linked with each other and to be controlled by the inside/outside air adjusting mechanism.

The inside/outside air switching portion 4 is located at a side of the blower 3 in the vehicle right-left direction on an upstream air side of the blower 3 in the air flow direction. That is, the inside/outside air switching portion 4 is located at a side opposite to the air conditioning unit 1 with respect to the blower unit 2 in the vehicle right-left direction. In this embodiment, the blower 3 includes a double-axial motor 37 having a rotation axis extending approximately in the top-bottom direction (vertical direction) of the vehicle, two centrifugal fans (sirocco fan) 38 located at two sides in the motor axial direction to be driven by the double-axial motor 37, and a scroll casing 39 for accommodating therein the centrifugal fan 38. For example, in this embodiment, a flat brushless motor is used as the double-axial motor 37.

The centrifugal fan 38 is made of resin to have a fan diameter D1 shown in FIG. 2 and a fan height H3 shown in FIG. 1. Furthermore, as shown in FIG. 3, an evaporator (i.e., cooling heat exchanger) 12 of the air conditioning unit 1 includes an air passing portion 12a (i.e., core portion) through which air passes approximately horizontally. The air passing portion 12a of the evaporator 12 has a height H1 shown in FIG. 3 in the top-bottom direction. The fan diameter D1 of the centrifugal fan 38 is set such that a ratio (D1/H1) of the fan diameter D1 to the height H1 of the air passing portion 12a of the evaporator 12 is about in a range of 30% to 60%. Furthermore, the fan height H3 of the centrifugal fan 38 is set such that a ratio (H3/H1) of the fan height H3 to the height H1 of the air passing portion 12a of the evaporator 12 is about in a range of 20% to 40%.

Furthermore, in this embodiment, a height of a motor body portion of the double-axial motor 37 except for the shaft is set to be about in a range of 20% to 40% of the height H1 of the air passing portion 12a of the evaporator 12. The scroll casing 39 is made of resin having an excellent strength and having an elasticity with some degrees. Each of the centrifugal fans 38 has blades arranged in a scroll shape in a circumferential direction. As shown in FIG. 1, the scroll casing 39 is provided with two suction ports 40, at two axial sides of the centrifugal fans 38, from which air introduced in the inside/outside air switching portion 4 is drawn. A part of the scroll casing 39 extends approximately horizontally, so as to form two air outlet portions 41 corresponding to the two centrifugal fans 38 of the blower unit 2.

The two air outlet portions 41 are adjacent to each other in the top-bottom direction, and protrude from the air blowing case 31 in the right-left direction. The two air outlet portions 41 adjacent to each other in the top-bottom direction are configured to form a single air outlet at its downstream end, and the single air outlet communicates with the air conditioning unit 1, as shown in FIG. 1. That is, the downstream end sides of the two air outlet portions 41 are adjacent to each other and are joined to form as the single air outlet. Therefore, the downstream end sides of the two air outlet portions 41 communicate with an inlet portion of the air conditioning unit 1, as the single air outlet of the blower 3. The air outlet portions 41 at its downstream ends have a height H2 shown in FIG. 1 that is approximately equal to the height H1 of the air passing portion 12a of the evaporator 12, when being located approximately at the same height position.

A filter 36 for cleaning air flowing from the inside/outside air switching portion 4 is located between the inside/outside air switching portion 4 and the blower 3. The filter 36 is elongated in the top-bottom direction and has a height approximately equal to a height of the air blowing case 31. Air drawn from at least one of the inside air suction ports 32a, 32b and the outside air suction port 33 is blown by the blower 3 toward air outlet opening portions 20, 22, 24 described later.

Next, the structure of the air conditioning unit 1 will be simply described. As shown in FIG. 3, the air conditioning unit 1 includes the evaporator 12 and a heater core (heating heat exchanger) 13 which are located within an air conditioning case 11. The air conditioning case 11 may be constructed of two division case members dividable in the right-left direction and having division surfaces extending in the top-down direction. The air conditioning case 11 is made of resin e.g., polypropylene, having an excellent strength and having elasticity with some degrees.

The division case members of the air conditioning case 11 are air-tightly fastened by a fastening member such as a metal spring clip or a screw after the evaporator 12, the heater core 13 and other components such as doors 16, 21, 25 are accommodated therein. The air conditioning unit 1 is mounted to the vehicle in the arrangement state shown in FIG. 1 in the vehicle front-rear direction and the vehicle right-left direction. The air conditioning case 11 is provided with an air inlet portion 14 at the most front side position.

The air inlet portion 14 is open at a side surface of the air conditioning case 11 on a front-passenger's seat side (e.g., left side in FIG. 1), and is connected to the downstream end side of the air outlet portions 41 of the blower 3 so that air blown by the blower 3 flows into the air conditioning unit 1 from the air inlet portion 14. The evaporator 12 is located in the air conditioning case 11 at a position directly after the air inlet portion 14 in an air flow direction, and extends to cross all the sectional passage area of the air conditioning case 11.

The evaporator 12 is one of components of a refrigerant cycle, so that refrigerant in the refrigerant cycle is evaporated in the evaporator 12 by absorbing heat from air. Therefore, air passing through the evaporator 12 is cooled by the evaporation latent heat of the refrigerant. The evaporator 12 is thin in the vehicle front-rear direction, and extends in the vehicle top-bottom direction, so that air passes through the evaporator 12 approximately horizontally, as shown in FIG. 3.

The evaporator 12 may be a generally known evaporator. For example, the evaporator 12 is a stack type in which plural flat tubes are stacked and corrugated fins are located between adjacent flat tubes. The flat tube may be formed by joining two metal thin plates. In the evaporator 12, the plural flat tubes and corrugated fins are integrated by brazing to form the air passing portion 12a (core portion) in which air passing therethrough is heat exchanged with refrigerant flowing therein. Two tank portions 12b are connected to two ends of the air passing portion 12a of the evaporator 12 to communicate with the flat tubes of the air passing portion 12a. The tank portions 12b are located for distributing the refrigerant into the flat tubes and for joining and discharging the refrigerant from the flat tubes. As shown in FIGS. 1 and 2, refrigerant pipes 26 are connected to a side portion of the evaporator 12 in the vehicle right-left direction. The refrigerant pipes 26 extending from the side portion of the evaporator 12 pass through a space 42 formed between the two scroll casings 39, and extend to through holes of the fire wall FW. As shown in FIG. 1, the two scroll casings 39 are arranged in the top-bottom direction to form the space 42 therebetween. Therefore, the refrigerant pipes 26 extending from the side portion of the evaporator 12 to the space 42 pass through the space 42, extend toward the front side of the vehicle, and penetrate through the through holes of the fire wall FW. Through the refrigerant pipes 26, the evaporator 12 is coupled to the other components of the refrigerant cycle.

The heater core 13 for heating air is located in the air conditioning case 11 at a vehicle rear side of the evaporator 12 such that air having passed through the evaporator 12 passes through the heater core 13. The heater core 13 is disposed adjacent to the evaporator 12 while having a space therebetween. Generally, the heater core 13 heats air using engine-cooling water (hot water) as a heat source. The heater core 13 is thin in the vehicle front-rear direction and is elongated in the vehicle top-bottom direction, similarly to the evaporator 12. The heater core 13 may be slightly tilted to a vehicle rear side from the vehicle top-bottom direction.

The heater core 13 may be a generally known heat exchanger. For example, the heater core 13 is a stack type in which plural flat tubes are stacked and corrugated fins are located between adjacent flat tubes. In the heater core 13, the plural flat tubes and corrugated fins are integrated by brazing to form an air passing portion 12a (core portion) in which air passing therethrough is heat exchanged with the engine-cooling water. Two tank portions are connected to two ends of the air passing portion of the heater core 13 to communicate with the flat tubes. A water pipe 27 is connected to a side portion of the heater core 13, extends toward the front side along a side surface of the air conditioning case 11, and penetrates through a through hole provided in the fire wall FW, as shown in FIG. 3.

Within the air conditioning case 11, the heater core 13 is located at a lower side portion so as to form a bypass passage 15 at a front upper side of the heater core 13. Therefore, air having passed through the evaporator 12 bypasses the heater core 13 through the bypass passage 15. An air mix door 16 is located in the air conditioning case 11 between the evaporator 12 and the heater core 13 so as to adjust a ratio between an air amount passing through the heater core 13 and an air amount passing through the bypass passage 15.

For example, the air mix door 16 is a plate-like door that has a rotation shaft 16a extending approximately in the horizontal direction, and a plate member 16b integrally rotatable with the rotation shaft 16a in the vehicle top-bottom direction. The air mix door 16 can be used as a temperature adjusting portion for adjusting the temperature of air blown into the passenger compartment.

The plate member 16b can be formed integrally with the rotation shaft 16a by using a resin material. The rotation shaft 16a is rotatably supported in the air conditioning case 11, and one end of the rotation shaft 16a protrudes outside from the air conditioning case 11 so as to be connected to a link mechanism. Therefore, the rotation position of the air mixing door 16 is controlled by a temperature control mechanism (e.g., an actuator mechanism such as a servomotor) of the air conditioner via the link mechanism.

A wall portion 17 is formed integrally with the air conditioning case 11 at a downstream side of the heater core 13 to have a predetermined space therebetween. The wall portion 17 extends in the top-down direction from a portion on a rear side of the heater core 13 so as to form a warm air passage 18. Therefore, warm air immediately after passing through the heater core 13 flows upwardly through the warm air passage 18 and is joined with cool air from the cool air bypass passage 15 at an air mix portion 19 positioned at an upper side of the heater core 13. Therefore, conditioned air having a desired temperature can be obtained in the air mixing portion 19, and is blown into the passenger compartment via at least one of the air outlet opening portions 20, 21, 22.

Specifically, a defroster opening portion 20 is provided in a top surface portion of the air conditioning case 11 at a vehicle front side position so that conditioned air having temperature-controlled flows from the air mix portion 19 into the defroster opening portion 20 through a first inlet hole 20a, as shown in FIG. 3. The defroster opening portion 20 is coupled to a defroster air outlet via a defroster duct, so that the conditioned air is blown mainly from the defroster air outlet toward the inner surface of a windshield via the defroster duct.

The air conditioning case 11 is provided with a second inlet hole 23 through which the air mixing portion 19 communicates with a face opening portion 22 and a third inlet hole 24a which are positioned downstream of the second inlet hole 23. The first inlet hole 20a and the second inlet hole 23 are selectively opened and closed by a defroster door 21. Thus, the defroster opening portion 20 and the second inlet hole 23 are selectively opened and closed by the defroster door 21. The defroster door 21 is rotatably supported in the air conditioning case 11. The defroster door 21 includes a rotation shaft 21a arranged approximately in the horizontal direction, and a plate member 21b formed integrally with the rotation shaft 21a by using a resin material.

A foot opening portion 24 is provided in the air conditioning case 11 at a downstream air side of the third inlet hole 24a. The face opening portion 22 and the third inlet hole 24a are selectively opened and closed by a foot/face door 25. Thus, the face opening portion 22 and the foot opening portion 24 are selectively opened and closed by the foot/face door 25. The foot/face door 25 is rotatably supported in the air conditioning case 11. The foot/face door 25 includes a rotation shaft 25a arranged approximately in the horizontal direction, and a plate member 25b formed integrally with the rotation shaft 25a by using a resin material.

The defroster door 21 and the foot/face door 25 are connected to a link mechanism to be operatively linked with each other via the link mechanism. The defroster door 21 and the foot/face door 25 are controlled by an air outlet mode switching mechanism (e.g., actuator mechanism such as a servomotor) via the link mechanism. The face opening portion 22 is coupled to a center face air outlet (not shown) via a center face duct (not shown). The center face air outlet (not shown) is provided on the upper surface portion of the air conditioning case 11 in a center area portion of the instrument panel in the vehicle right-left direction, such that conditioned air (e.g., mainly cool air) is blown toward the upper area of a passenger on the front seat in the passenger compartment.

Furthermore, the face opening portion 22 is coupled to side face air outlets (not shown) via a side face air duct (not shown). The side face air outlets are provided on the upper surface portion of the air conditioning case 11 at right and left side areas of the instrument panel in the vehicle right-left direction, such that conditioned air (e.g., mainly cool air) is blown toward the inner surfaces of side window glasses and toward the upper area of the passenger on the front seat in the passenger compartment.

The side face air outlets may have a generally known structure. The side face air outlet may be provided a flow changing mechanism for manually changing the flow of air. For example, the flow changing unit includes flow-adjustable plates so that conditioned air can selectively flow toward the side window glass or the upper portion of the front passenger.

The foot opening portion 24 is coupled to a foot air outlet (not shown) via a foot duct (not shown), such that conditioned air (e.g., mainly warm air) is blown toward the lower area of the passenger on the front seat in the passenger compartment.

The doors 16, 21, 25 are rotatable respectively by the rotation shafts 16a, 21a, 25a. In this embodiment, the rotation shafts 16a, 21a, 25a extend approximately horizontally, and have approximately identical length. Each of the plate members 16b, 21b, 25b has a door base plate made of resin, and a seal material made of an elastic material such as an urethane foam is attached to two surfaces of each plate member 16b, 21b, 25b.

The air conditioner is provided with a control device (not shown) into which operation signals from operation members provided in an air conditioning operation panel (not shown) and sensor signals from various sensors are input. The control device outputs various control signals to operation members such as doors 16, 21, 25, 34, 35 of the air conditioner based on the input operation signals and the input sensor signals, so that rotation positions of the doors 16, 21, 25, 25, 34, 35 are controlled.

According to the embodiment of the present invention, the blower 3 includes the double-axial motor 37 having a rotation shaft arranged approximately in the top-bottom direction (vertical direction), two centrifugal fans 38 driven by the double-axial motor 37 at two sides of the double-axial motor 37, and the two scroll casings 39 each of which houses the centrifugal fan 38. The two scroll casings 39 are provided with the suction ports 40 at two sides of the blower 3 in the axial direction, and the air outlet portions 41. Each of the air outlet portions 41 is formed by extending a part of the scroll casing 39 in the circumferential direction of the centrifugal fan 38 approximately horizontally. The two air outlet portions 41 are adjacent to each other in the top-bottom direction and extend to a downstream air side. The two air outlet portions 41 communicate with the air inlet portion 14 of the air conditioning unit 1, as a single air outlet of the blower 3. Furthermore, the height H2 of the single air outlet portion configured with the two air outlet portions 41 is approximately equal to the height H1 of the air passing portion 12a (core portion) of the evaporator 12.

In the air flow portion from the blower 3 to the air conditioning unit 1, the air outlet of the blower 3 is positioned approximately at the same height position as the air passing portion 12a of the evaporator 12, and the height H2 of the air outlet of the blower 3 is approximately equal to the height H1 of the air passing portion 12a. Therefore, the air flow from the blower 3 toward the evaporator 12 is not rapidly enlarged, thereby the air flow distribution at the inlet portion 14 of the air conditioning unit 1 can be made uniform. Thus, the pressure loss and the noise can be effectively reduced in the air conditioner.

Furthermore, the diameter of the centrifugal fan 38 of the blower 3 can be set at a small value that is about in a range of 30% to 60% of the height H1 of the air passing portion 12a of the evaporator 12. Therefore, the dimension of the blower unit 2 in the vehicle front-rear direction can be effectively reduced so as to enlarge the space of the front-passenger seat side. Furthermore, it is possible to operate the centrifugal fan 38 at a low torque and to reduce the power consumption.

The refrigerant pipes 26 of the evaporator 12 are arranged to pass through the space 42 formed between the two scroll casings 39. Therefore, the air conditioner can be constructed in compact.

The double-axial motor 37 may be a brushless motor. In this case, the fan height H3 of the centrifugal fan 38 can be made larger by the reduced dimension of the motor. Furthermore, because the two centrifugal fan 38 is used at both sides of the double-axial motor 37 constructed of the brushless motor, the blower 3 can be rotated at a high speed.

Furthermore, the fan diameter D1 of the centrifugal fan 38 is set such that the ratio (D1/H1) of the fan diameter D1 to the height H1 of the air passing portion 12a of the evaporator 12 is about in a range of 30% to 60%. Furthermore, the fan height H3 of the centrifugal fan 38 is set such that the ratio (H3/H1) of the fan height H3 to the height H1 of the air passing portion 12a of the evaporator 12 is about in a range of 20% to 40%. Accordingly, the ratio (H3/D1) of the fan height H3 to the fan diameter D1 can be set in a range of 40% to 50% that is optimum range with a high fan efficiency and a low noise in the centrifugal fan 38.

In the blower unit 2, the inside/outside air switching portion 4 is arranged at one side of both the scroll casings 39. Therefore, air can be effectively drawn into both the scroll casings 39 from the inside/outside air switching portion 4.

The filter 36 for cleaning air from the inside/outside air switching portion 4 is located between the inside air switching portion 4 and the blower 3 to extend vertically to all passage section of both the scroll casing 39, so that the height of the filter 36 is approximately equal to the height of the blower unit 2. Thus, the area of the filter 36 can be made larger while the dimension of the filter 36 in the vehicle front-rear direction can be reduced.

In the above-described embodiment, the two air outlet portions 41 have top and bottom surfaces (outside surface parts) that are approximately parallel to each other, as shown in FIG. 1. Furthermore, the inner surface parts of the two air outlet portions 41 in the top-bottom direction are gradually enlarged toward the downstream end side to have the space 42 that is gradually reduced toward the downstream end side. Therefore, the pressure loss and the noise can be more effectively reduced.

OTHER EMBODIMENTS

Although the present invention has been fully described in connection with the preferred embodiments thereof with reference to the accompanying drawings, it is to be noted that various changes and modifications will become apparent to those skilled in the art.

For example, in the above-described embodiment of the present invention, the structure of the air conditioning unit 1 other than the evaporator 12 and the air inlet portion 14 may be suitably changed without being limited to the structure shown in FIG. 3.

In the above-described embodiment of the present invention, the refrigerant pipes 26 of the evaporator 12 are arranged to pass through the space 42 between the two scroll casings 39. However, the refrigerant pipes 26 may be not pass through the space 42 between the two scroll casings 39, or the water pipe 27 of the heater core 13 may be set to path through the space 42, or both the refrigerant pipes 26 and the water pipe 27 may pass through the space 42.

In the above-described embodiment, the downstream ends of the air outlet portions 41 of the scroll casings 39 are directly joined as the single air outlet to the air inlet portion 14 of the air conditioning case 11. However, the air outlet portions 41 of the scroll casings 39 can be connected to the inlet portion 14 of the air conditioning case 11 via connection pipes, and a space 42 may be provided between the connection pipes. In this case, at least one of the refrigerant pipes 26 and the water pipe 27 may be set to pass through the space 42. Furthermore, the downstream ends of the connection pipe may be joined as the single air outlet to the air inlet portion 14 of the air conditioning case 11.

In the above-described embodiment, the downstream ends of the air outlet portions 41 of the scroll casings 39 may be partitioned by a thin plate while being adjacent to each other without a space therebetween in the vehicle top-bottom direction. Even in this case, the downstream ends of the air outlet portions 41 of the scroll casings 39 can be joined substantially as the single air outlet to the air inlet portion 14 of the air conditioning case 11.

In the above-described embodiment, the air conditioner including the blower unit 2 and the air conditioning unit 1 is typically used for a vehicle. However, the structures of the blower unit 2 and the air conditioning unit 1 may be used for an air conditioner for the other use, without being limited to the vehicle.

Such changes and modifications are to be understood as being within the scope of the present invention as defined by the appended claims.

What is claimed is:

1. An air conditioner for a vehicle having a passenger compartment, the air conditioner comprising:
    an air conditioning unit located on a front side in the passenger compartment at an approximately center portion in a vehicle width direction, the air conditioning unit including a cooling heat exchanger that is located to have an air passing portion through which the air passes approximately horizontally; and
    a blower unit having a blower that is configured to blow air to the air conditioning unit, the blower unit being located at a position offset from the air conditioning unit in the vehicle width direction;
    a refrigerant pipe connected to the cooling heat exchanger, wherein:
    the blower includes a double-axial motor having a rotation axis positioned approximately in a vehicle top-bottom direction, a pair of centrifugal fans located at two sides of the double-axial motor in an axial direction to be driven by the double-axial motor, and a pair of scroll casings in which the centrifugal fans are accommodated, respectively;

the pair of scroll casings has two suction ports opened at two opposite sides of the centrifugal fans in the axial direction that is substantially the vehicle top-bottom direction;

the scroll casings have a pair of scroll shapes in a circumferential direction of the centrifugal fans, and a part of the scroll shapes of the scroll casings extend approximately horizontally to have two air outlets;

the two air outlets extend approximately horizontal;

the two air outlets are stacked one on top of the other in the vehicle top-bottom direction to be joined to an air inlet portion of the air conditioning unit, substantially as a single air outlet;

the two air outlets are located approximately at the same height position as that of the air passing portion of the cooling heat exchanger, and have a height dimension (H2) at a downstream end side that is approximately equal to a height dimension (H1) of the air passing portion of the cooling heat exchanger;

the scroll casings are arranged in the vehicle top-bottom direction to have a space therebetween; and the refrigerant pipe is located in the space.

2. The air conditioner according to claim 1, wherein:
the air conditioning unit further includes a heating heat exchanger for heating air using hot water as a heat source, and a water pipe connected to the heating heat exchanger; and
the water pipe is located in the space.

3. The air conditioner according to claim 1, wherein the double-axial motor is a brushless motor.

4. The air conditioner according to claim 1, wherein the centrifugal fan has a fan diameter that is about in a range between 30% to 60% of the height dimension of the air passing portion of the cooling heat exchanger.

5. The air conditioner according to claim 1, wherein the centrifugal fan has a fan height that is about in a range between 20% to 40% of the height dimension of the air passing portion of the cooling heat exchanger.

6. The air conditioner according to claim 1, wherein:
the blower unit further includes an inside/outside air switching portion that is configured to introduce inside air inside the passenger compartment and outside air outside the passenger compartment, and to control a ratio between an amount of inside air and an amount of outside air to be introduced; and
the inside/outside air switching portion is located at a side of the pair of scroll casings in the vehicle width direction.

7. The air conditioner according to claim 6, further comprising
a filter located between the inside/outside air switching portion and the blower to clean air flowing from the inside/outside air switching portion.

8. The air conditioner according to claim 7, wherein the filter has a height dimension that is approximately the same as a height dimension of the blower unit.

9. The air conditioner according to claim 1, wherein:
the two air outlets of the blower unit extend approximately horizontally to have a space therebetween, and are joined at a downstream end side without having a space therebetween.

10. The air conditioner according to claim 1, wherein the two air outlets have top and bottom surfaces that are approximately parallel to each other.

11. An air conditioner comprising:
an air conditioning unit including a cooling heat exchanger that is located to have an air passing portion through which air passes approximately in a first direction; and
a blower unit having a blower that is configured to blow air to the air conditioning unit;
a refrigerant pipe connected to the cooling heat exchanger, wherein:
the blower includes a double-axial motor having a rotation axis positioned approximately in a second direction perpendicular to the first direction, a pair of centrifugal fans located at two sides of the double-axial motor in an axial direction to be driven by the double-axial motor, and a pair of scroll casings in which the centrifugal fans are accommodated, respectively;
the pair of scroll casings has two suction ports opened at two opposite sides of the centrifugal fans in the axial direction that is substantially the second direction;
the scroll casings have a pair of scroll shapes in a circumferential direction of the centrifugal fans and a part of the scroll shapes of the scroll casings extend approximately in a third direction that is perpendicular to both the first direction and the second direction to have two air outlets;
the two air outlets extending approximately in the third direction;
the two air outlets are stacked one on top of the other in the second direction to be joined to an air inlet portion of the air conditioning unit, substantially as a single air outlet;
the two air outlet portions are located approximately at the same position as that of the air passing portion of the cooling heat exchanger in the second direction, and have a dimension (H2) at its downstream end side in the second direction, that is approximately equal to a dimension (H1) of the air passing portion of the cooling heat exchanger in the second direction
the scroll casings are arranged in the second direction to have a space therebetween; and
the refrigerant pipe is located in the space.

12. The air conditioner according to claim 11, wherein:
the air conditioning unit further includes a heating heat exchanger for heating air using hot water as a heat source, and a water pipe connected to the heating heat exchanger; and
the water pipe is located in the space.

13. The air conditioner according to claim 11, wherein the double-axial motor is a brushless motor.

14. The air conditioner according to claim 11, wherein the centrifugal fan has a fan diameter that is about in a range between 30% to 60% of the height dimension of the air passing portion of the cooling heat exchanger.

15. The air conditioner according to claim 11, wherein the centrifugal fan has a fan height that is about in a range between 20% to 40% of the height dimension of the air passing portion of the cooling heat exchanger.

16. The air conditioner according to claim 11, wherein:
the two air outlets of the blower unit extend approximately in the third direction to have a space therebetween, and are joined at a downstream end side without having a space therebetween.

17. An air conditioner for a vehicle having a passenger compartment, the air conditioner comprising:
an air conditioning unit located on a front side in the passenger compartment at an approximately center portion in a vehicle width direction, the air conditioning unit including a cooling heat exchanger that is located to have an air passing portion through which the air passes approximately horizontally; and a blower unit having a blower that is configured to blow air to the air conditioning unit, the blower unit being located at a position offset from the air conditioning unit in the vehicle width direction, wherein:

the blower includes a double-axial motor having a rotation axis positioned approximately in a vehicle top-bottom direction, a pair of centrifugal fans located at two sides of the double-axial motor in an axial direction to be driven by the double-axial motor, and a pair of scroll casings in which the centrifugal fans are accommodated, respectively;

the pair of scroll casings has two suction ports opened opposite to the centrifugal fans at opposite sides in the axial direction, and two air outlet portions extending approximately horizontally;

the two air outlet portions are stacked one on top of the other in the vehicle top-bottom direction to be joined to a single air inlet portion of the air conditioning unit leading to the cooling heat exchanger in an air flow direction of the air passing through the air passing portion;

the two air outlet portions are located approximately at the same height position as that of the air passing portion of the cooling heat exchanger, and have a height dimension (H2) at its downstream end side that is approximately equal to a height dimension (H1) of the air passing portion of the cooling heat exchanger a refrigerant pipe is connected to the cooling heat exchanger, wherein:

the scroll casings are arranged to have a space therebetween; and the refrigerant pipe is located in the space.

* * * * *